United States Patent
Jeong

(10) Patent No.: US 8,782,649 B2
(45) Date of Patent: Jul. 15, 2014

(54) REAL-TIME SCHEDULING OF TASK SETS AND DETERMINATION OF TASK SETS BASED ON VERIFIED WEIGHT, CACHE HIT RADIO OF THE TASKS AND AVAILABLE PROCESSING CORES

(75) Inventor: Min Kyu Jeong, Seongnam-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 709 days.

(21) Appl. No.: 12/453,171

(22) Filed: Apr. 30, 2009

(65) Prior Publication Data

US 2010/0162253 A1    Jun. 24, 2010

(30) Foreign Application Priority Data

Dec. 18, 2008    (KR) ........................ 10-2008-0129146

(51) Int. Cl.
*G06F 9/46*    (2006.01)
(52) U.S. Cl.
USPC ............ 718/102; 718/100; 718/104; 718/105
(58) Field of Classification Search
USPC ................................................ 718/102, 105
See application file for complete search history.

(56) References Cited

U.S. PATENT DOCUMENTS

| | | | | |
|---|---|---|---|---|
| 5,528,513 | A * | 6/1996 | Vaitzblit et al. | 718/103 |
| 5,694,602 | A * | 12/1997 | Smith | 718/105 |
| 7,086,057 | B2 * | 8/2006 | Hayashi | 718/102 |
| 7,870,554 | B2 * | 1/2011 | Dodge et al. | 718/102 |
| 7,954,106 | B2 * | 5/2011 | Kern et al. | 718/104 |
| 2003/0078954 | A1 * | 4/2003 | Haughey | 709/102 |
| 2003/0217090 | A1 * | 11/2003 | Chauvel et al. | 709/102 |
| 2004/0015971 | A1 * | 1/2004 | Spoltore et al. | 718/102 |
| 2005/0060709 | A1 * | 3/2005 | Kanai et al. | 718/100 |
| 2006/0218558 | A1 * | 9/2006 | Torii et al. | 718/107 |
| 2007/0204268 | A1 * | 8/2007 | Drepper | 718/102 |
| 2008/0098395 | A1 * | 4/2008 | Backer | 718/102 |
| 2008/0218558 | A1 * | 9/2008 | Yamashita | 347/68 |
| 2009/0049443 | A1 * | 2/2009 | Powers et al. | 718/100 |

OTHER PUBLICATIONS

Muhammad et al., Weight bound limits in supertasking approach for guaranteed timeline constraints, 2008, IEEE, pp. 9-16.*
Moir et. al., Pfair Scheduling of Fixed and Migrating Periodic Tasks on Multiple Resources, 1999, in Proceeding of the 20th IEEE Real-time system symposium, pp. 294-303.*
Anderson et al., Pfair Scheduling: Beyond Periodic Task Systems, 2000, Proceedings Real-Time computing system and Applications, pp. 297-306.*
Kato et al., Real-Time Scheduling with Task Splitting on Multiprocessors, 2007, IEEE, International Conference on Embedded and ral-Time computing Systems and Applications.*
Devi et al., Real-time scheduling on multicore platforms, 2006, IEEE.*
Anderson et al., Real-Time Scheduling on Multicore Platforms; Apr. 2006, IEEE, pp. 179-190.*
Calandrino et al., A hybrid real-time scheduling approach for large-scale multicore platforms, 2007, IEEE.*

* cited by examiner

*Primary Examiner* — Meng An
*Assistant Examiner* — Abu Ghaffari
(74) *Attorney, Agent, or Firm* — Staas & Halsey LLP

(57) ABSTRACT

A central processing unit (CPU) and a real-time scheduling method applicable in the CPU are disclosed. The CPU may determine a first task set and a second task set from among assigned tasks, schedule the determined first task set in a single core to enable the task to be processed, and schedule the determined second task set in a multi-core to enable the task to be processed.

12 Claims, 6 Drawing Sheets

REAL-TIME SCHEDULING OF TASK SETS AND DETERMINATION OF TASK SETS BASED ON VERIFIED WEIGHT, CACHE HIT RADIO OF THE TASKS AND AVAILABLE PROCESSING CORES

CROSS-REFERENCE TO RELATED APPLICATIONS

This application claims the benefit of Korean Patent Application No. 10-2008-129146, filed on Dec. 18, 2008, in the Korean Intellectual Property Office, the disclosure of which is incorporated herein by reference.

BACKGROUND

1. Field

Example embodiments of the present disclosure relate to a central processing unit (CPU) that may effectively schedule tasks requiring a real-time performance, while ensuring the real-time performance, in a multi-core environment to be a base of an ultra-high performance embedded system such as a media service system of the future, an intelligent home server, and the like, and a real-time scheduling method applicable in the CPU.

2. Description of the Related Art

A multi-core based real-time scheduling algorithm may be roughly classified into a partitioned scheduling algorithm and a global scheduling algorithm. Each of the real-time scheduling algorithms may assign real-time tasks included in a queue to a core to enable the tasks to be processed in real time.

The partitioned algorithm may include effectively utilized algorithms, such as a partitioned-Earliest Deadline First (EDF), etc. However, the partitioned algorithm may cause a situation in which the tasks are not able to be scheduled to ensure the real-time performance even in a task set in which real-time scheduling is possible.

As a representative algorithm of the global scheduling algorithm, a Pfair algorithm may be used. The Pfair algorithm is an algorithm in which the multi-core based real-time scheduling is possible while ensuring the real-time performance in the tasks. Specifically, the Pfair algorithm may ensure the real time performance with respect to all task sets in which the real-time performance is determined to be ensured. However, in the global scheduling algorithm, problems may frequently occur, such as task migration and context switch, and much overhead may occur in system resources as a result. Consequently, the global scheduling algorithm such as the Pfair algorithm may ensure the real-time performance in a multi-core environment in theory, however, may be rarely used in an actual environment.

SUMMARY

Additional aspects and/or advantages will be set forth in part in the description which follows and, in part, will be apparent from the description, or may be learned by practice of the invention.

The foregoing and/or other aspects may be achieved by providing a real-time scheduling method including scheduling a first task set in a single core; scheduling a second task set in a multi-core; and processing a task scheduled in at least one of the single core and the multi-core.

The foregoing and/or other aspects may be achieved by providing a real-time scheduling method including: determining a victim task from among assigned tasks; dividing the determined victim task into a first task part and a second task part; determining a first task set including the first task part of the assigned tasks; determining a second task set including the second task part of the assigned tasks; and processing the determined first task set in a first core and processing the determined second task set in a second core.

The foregoing and/or other aspects may be achieved by providing a central processing unit (CPU) including a plurality of cores to process assigned tasks; and a scheduler to schedule the assigned tasks in the plurality of cores.

One or more example embodiments may provide a CPU implementing a real-time scheduling method, which may solve overhead caused from problems such as task migration and context switching that frequently occur in a global scheduling algorithm.

One or more example embodiments may also provide a CPU implementing a real-time scheduling method, which may process, in real time, all task sets in which real-time performance is determined to be ensured.

BRIEF DESCRIPTION OF THE DRAWINGS

These and/or other aspects and advantages of example embodiments will become apparent and more readily appreciated from the following description, taken in conjunction with the accompanying drawings of which.

DETAILED DESCRIPTION OF EMBODIMENTS

Figure 1:
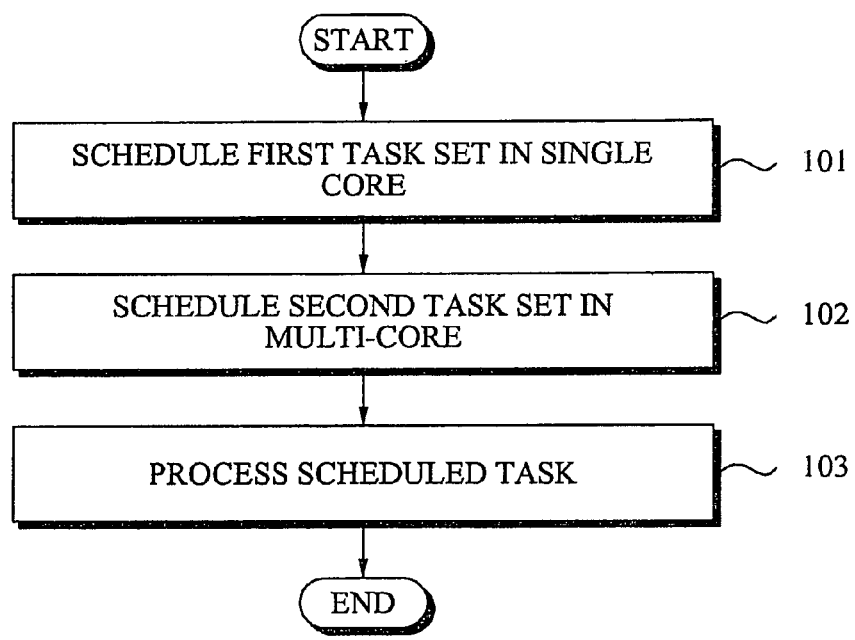
FIG. 1 is a flowchart illustrating a real-time scheduling method in a central processing unit (CPU) according to an example embodiment.

Reference will now be made in detail to example embodiments, examples of which are illustrated in the accompanying drawings, wherein like reference numerals refer to the like elements throughout. Example embodiments are described below to explain the present disclosure by referring to the figures.

When detailed descriptions related to a well-known related function or configuration are determined to make the spirit of the present disclosure ambiguous, the detailed descriptions will be omitted herein. Also, terms used throughout the present specification are used to appropriately describe exemplary embodiments of the present disclosure, and thus may be different depending upon a user and an operator's intention, or practices of application fields of the present disclosure. Therefore, the terms must be defined based on descriptions made through the present disclosure.

A real-time scheduling method simultaneously using a partitioned scheduling algorithm and a global scheduling algorithm according to an example embodiment will be described in detail with respect to FIGS. 1 to 3.

Specifically, the real-time scheduling method may select a combination, from among assigned tasks, in which a sum of a weight is '1' or less, and a largest number of tasks, which are presented, may schedule the selected combination in a single core using the partitioned scheduling algorithm, and also may schedule remaining combinations using the global scheduling algorithm by enabling the remaining combinations to be included in a queue.

FIG. 1 is a flowchart illustrating a real-time scheduling method in a central processing unit (CPU) according to an example embodiment.

Referring to FIG. 1, in operation 101, the real-time scheduling method according to an example embodiment may schedule a first task set in a single core in order to apply the real-time scheduling method to the assigned tasks.

In operation 102, the real-time scheduling method may schedule a second task set in a multi-core.

In operation 103, the real-time scheduling method may process the scheduled task in at least one core in at least one operation of operations 101 and 102.

A CPU implementing the real-time scheduling method according to an example embodiment will be described in detail with reference to FIG. 2.

Figure 2:
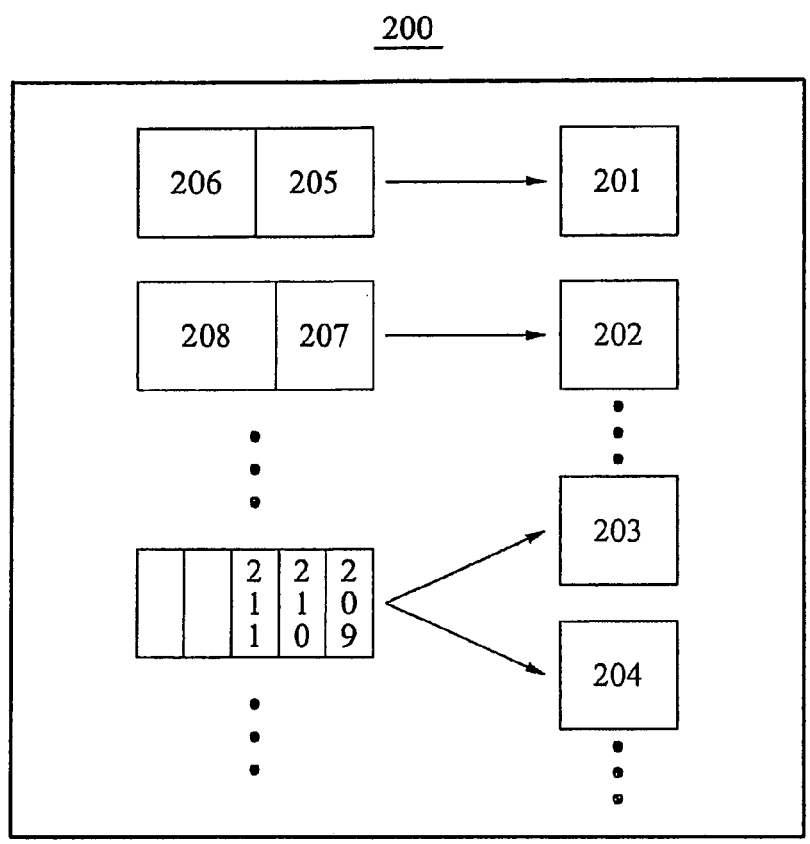
FIG. 2 is a block diagram illustrating a CPU in which the real-time scheduling method of FIG. 1 is applicable.

FIG. 2 is a block diagram illustrating a CPU 200 in which the real-time scheduling method of FIG. 1 is applicable.

The CPU 200 may include cores 201, 202, 203, and 204 to process tasks 205, 206, 207, 208, 209, 210, and 211 assigned from a memory, etc., and may enable the tasks 205-211 to be scheduled in the cores 201-204 and processed.

Specifically, the CPU 200 may include a first core 201, a second core 202, a third core 203, and a fourth core 204.

In this instance, the tasks 205-211 assigned from the memory may be a task set type including at least one task, and may be scheduled in at least one core of a first core 201, a second core 202, a third core 203, and a fourth core 204 through a queue.

For example, a first task set including the tasks 205 and 206 and a second task set including the tasks 207 and 208 may be respectively scheduled in the first core 201 and second core 202 and processed, and a third task set including tasks 209, 210, and 211 may be scheduled in at least one of the third core 203 and the fourth core 204 and processed.

Specifically, as illustrated in FIG. 2, the CPU 200 may be operated as a scheduling algorithm of a hybrid scheme combining a conventional partitioned scheduling algorithm and a global scheduling algorithm.

When a task is assigned, the CPU 200 may need to determine to schedule the task using the partitioned scheduling algorithm or the global scheduling algorithm.

When the assigned tasks are determined to be scheduled using the partitioned scheduling algorithm, the CPU 200 may determine a task set to be scheduled using the partitioned scheduling algorithm from among the assigned tasks to thereby schedule the tasks in a single-core.

Specifically, the tasks 205 and 206 from among the assigned tasks may be determined as a first task set, and scheduled in the first core 201. Similarly, the tasks 207 and 208 may be determined as a second task set, and scheduled in the second core 202.

Also, when the assigned tasks are determined to be scheduled using the global scheduling algorithm, the CPU 200 may determine a task set to be scheduled using the global scheduling algorithm from among the assigned tasks to thereby schedule the tasks in a multi-core.

Specifically, the tasks 209-211 from among the assigned tasks may be determined as a third task set, and scheduled in the third core 203 and the fourth core 204.

The scheduled tasks may be processed in each core.

For this purpose, the CPU 200 may include a plurality of cores processing assigned tasks and a scheduler scheduling the assigned tasks in the plurality of cores.

Specifically, the scheduler may determine the first task set including the tasks 205 and 206 from among the assigned tasks to enable the determined task set to be scheduled in the first core 201, and also determine the third task set including the tasks 209-211 from among the assigned tasks to enable the determined task set to be scheduled in at least one of the third core 203 and the fourth core 204.

Also, the scheduler may verify a weight with respect to each of the assigned tasks, and determine sets of tasks in which a sum of the verified weights is less than '1'. In this instance, the scheduler may determine, as the first task set including the tasks 205 and 206, a set in which a largest number of tasks from among the determined sets are presented.

The scheduler according to an example embodiment may determine, as the third task set including the tasks 209-211, remaining tasks other than the first task set including the tasks 205 and 206.

Figure 3:
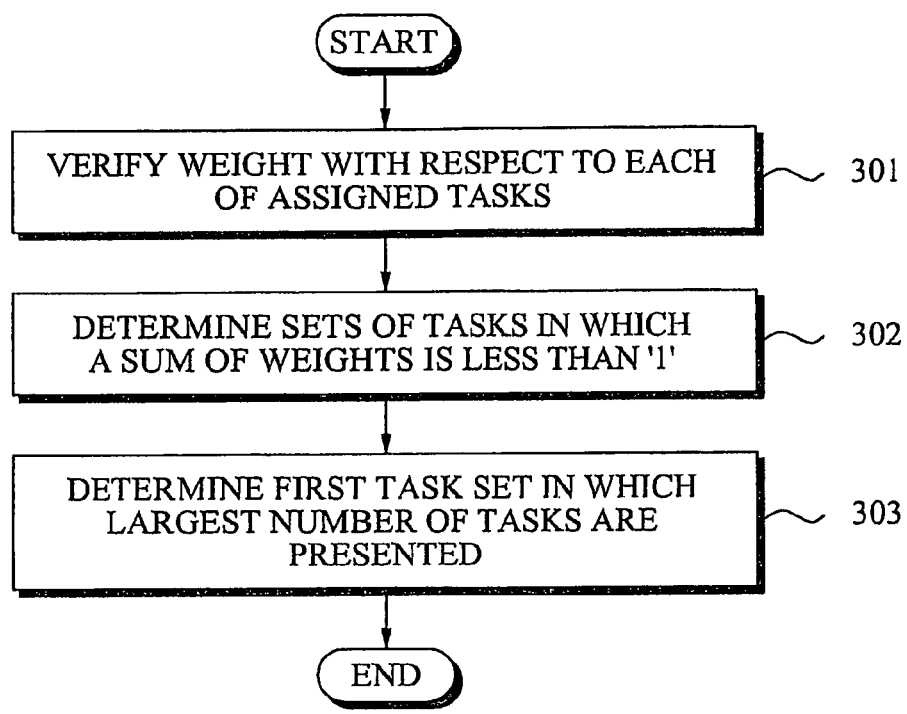
FIG. 3 is a flowchart illustrating that a first task set is determined by a CPU in which a real-time scheduling method according to an example embodiment is applicable.

FIG. 3 is a flowchart illustrating that a first task set is determined by a CPU in which a real-time scheduling method according to an example embodiment is applicable.

In operation 301, the real-time scheduling method according to the present example embodiment may verify a weight with respect to each of the assigned tasks.

In operation 302, the real-time scheduling method may determine sets of tasks in which a sum of the weights is less than '1' from among the assigned tasks, based on the verified weights. In this instance, the real-time scheduling method may ascertain that sets in which a sum of weights (performance time/performance cycle) of an overall task set is less than a number of cores that are able to be scheduled, and schedule only these sets. Specifically, a task set in which a sum of weights is less than the number of cores may ensure a real-time performance, and may be able to be scheduled.

Specifically, referring to FIG. 2 in terms of the weight, a sum of an overall weight of the first task set including the tasks 205 and 206 is required to be less than or equal to '1'. Specifically, since the tasks 205 and 206 are processed in the single core 201, the sum of the overall weight of the first task set is required to be less than or equal to the number of cores, thereby ensuring the real-time performance.

Also, a sum of an overall weight of the second task set including the tasks 207 and 208 is required to be less than or equal to '1'. Specifically, since the tasks 207 and 208 are processed in the single core 202, the sum of the overall weight of the second task set is required to be less than or equal to the number of cores, thereby ensuring the real-time performance.

Also, a sum of an overall weight of the third task set including the tasks 209-211 is required to be less than or equal to a total number of cores (the third core 203 and the fourth core 204).

When many task sets in which the sum of the weights is less than or equal to '1' are presented, the real-time scheduling method may determine the first task set in which a largest number of tasks are presented from among the determined sets in operation 303. Specifically, to increase efficiency of the CPU processing many tasks from among the determined sets, the task set in which a largest number of tasks are presented may be determined as the first task set.

The determined first task set may be assigned to a single core to be used in the partitioned scheduling algorithm.

The real-time scheduling method according to an example embodiment may determine, as another task set, remaining tasks other than the task sets used in the partitioned scheduling algorithm, and enable the determined tasks to be scheduled in a multi-core to be used in the global scheduling algorithm.

The real-time scheduling method according to an example embodiment may verify tasks in which a cache hit ratio is required to be higher than a predetermined ratio from among the assigned tasks, in order to determine the first task set. Thus, the real-time scheduling method may determine the first task set by including the verified task set.

The task set in which the cache hit ratio is required to be higher than the predetermined ratio may designate a task being sensitive to cache miss, and may be understood as a task in which a processing speed is reduced when task migration and context switch frequently occur.

For example, the task in which the cache hit ratio is required to be higher than the predetermined ratio may be understood as a task focusing on computing, and the determined first task set may be assigned to a queue through various algorithms, such as an existing Earliest-Deadline-First (EDF), etc.

For this purpose, the real-time scheduling method of the CPU may determine the tasks in which the cache hit ratio is required to be higher than the predetermined ratio from among the assigned tasks, in order to determine the first task set, determine sets of tasks in which the sum of weights is less than or equal to the number of cores, and determine the first task set in which the largest number of tasks are presented from among the determined sets.

Consequently, the CPU implementing the real-time scheduling method according to an example embodiment may solve an overhead caused from problems such as the task migration and context switching that frequently occur in the global scheduling algorithm. In addition, the CPU may process, in real time, all task sets determined to ensure the real-time performance.

Hereinafter, the real-time scheduling method of scheduling tasks using a victim task according to an example embodiment will be described in detail with reference to FIGS. 4 and 5.

Specifically, the real-time scheduling method of scheduling tasks using the victim task may be a method, based on the partitioned scheduling algorithm, in which at least one victim task is designated and the designated victim task is divided and assigned to another task set, and a method of adjusting all task sets to enable a sum of weights to be less than or equal to a number of cores will be hereinafter described in detail.

Figure 4:
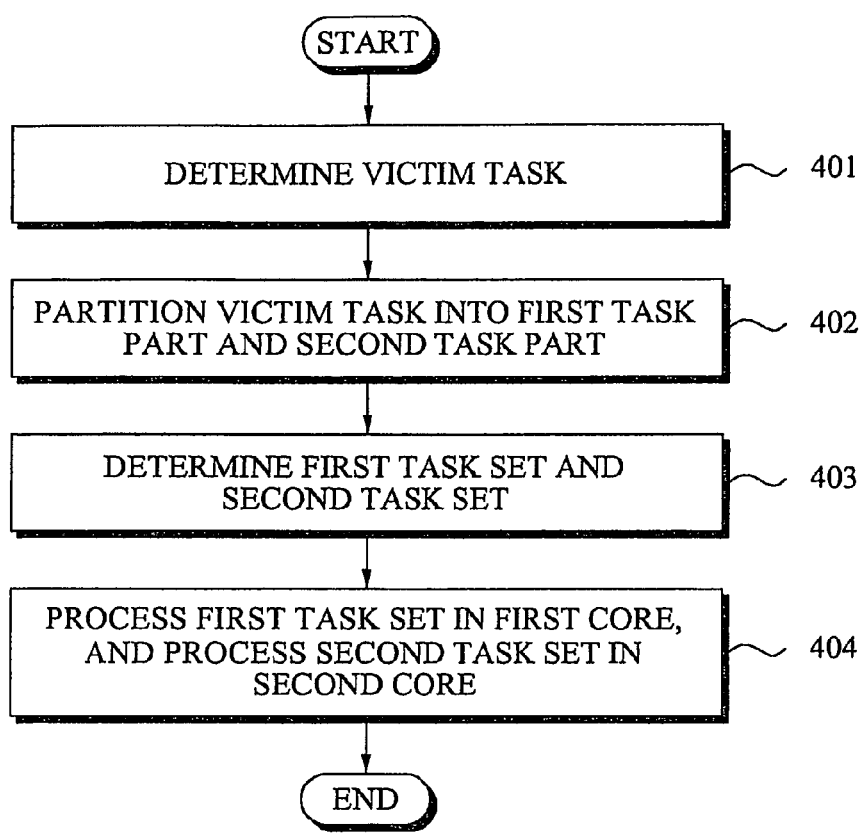
FIG. 4 is a flowchart illustrating a real-time scheduling method of a CPU according to another example embodiment.

FIG. 4 is a flowchart illustrating a real-time scheduling method of a CPU according to another example embodiment.

Referring to FIG. 4, in operation 401, the real-time scheduling method according to an example embodiment may determine a victim task from among tasks assigned from a memory.

The victim task may designate a task that is divided without being assigned in a single core, and each part of the divided task is processed in other cores.

In this instance, the victim task is required to be determined from among tasks not being sensitive to cache miss.

In operation 402, the real-time scheduling method may divide the determined victim task into at least two parts.

Hereinafter, for convenience of description, an example in which the victim task is divided into a first task part and a second task part will be described in detail.

In operation 403, when the victim task is divided, the real-time scheduling method may determine a first task set including the first task part from among the assigned tasks, and also determine a second task set including the second task part from among the assigned tasks.

Determining the victim task to divide the determined victim task into the first task set and the second task set is done in order to enable a sum of weights of a task set to be less than a number (1) of cores while approaching the number of cores.

Accordingly, the real-time scheduling method may determine, as the first task set, a set in which a largest number of tasks are presented from among sets in which a sum of the first task part and weight is less than '1' from among the assigned tasks.

Similarly, the real-time scheduling method may determine, as the second task set, a set in which a largest number of tasks are presented from among sets in which a sum of the second task part and weight is less than '1' from among the assigned tasks.

In operation 404, the real-time scheduling method may process the determined first task set in a first core, and also process the determined second task set in a second core.

A CPU implementing the real-time scheduling method of FIG. 4 will be described in detail with reference to FIG. 5.

Figure 5:
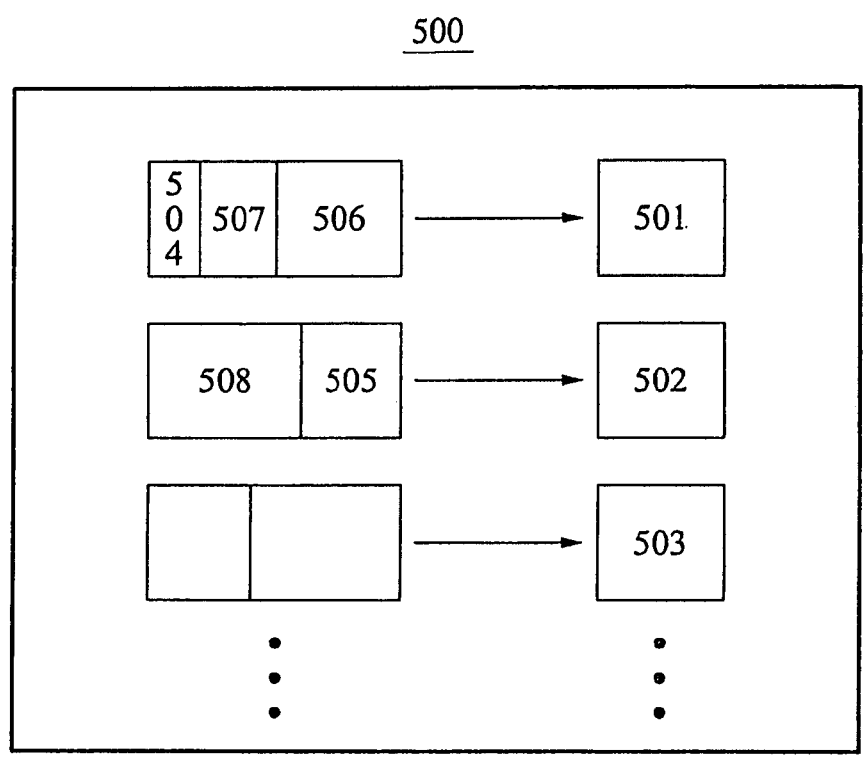
FIG. 5 is a block diagram illustrating a CPU in which the real-time scheduling method of FIG. 4 is applicable.

FIG. 5 is a block diagram illustrating a CPU 500 in which the real-time scheduling method of FIG. 4 is applicable.

The CPU 500 may schedule respective task sets in cores 501, 502, and 503, based on the partitioned scheduling algorithm.

Specifically, a first task part 504 of a victim task may be determined as a first task set together with tasks 506 and 507, and may be scheduled in a first core 501.

Also, a second task part 505 of the victim task may be determined as a second task set together with a task 508, and may be scheduled in a second core 502. Similarly, a third task set may be assigned to a third core 503 and processed.

For this purpose, the CPU 500 includes a scheduler as well as the first core 501 and the second core 502.

In this instance, the scheduler may determine a victim task from among the assigned tasks, and divide the determined victim task into the first task part 504 and the second task part 505.

In addition, the scheduler may include the first task part 504 from among the assigned tasks to determine the first task set including the tasks 504, 506, and 507, and also include the second task part 505 from among the assigned tasks to determine the second task set including the tasks 505 and 508.

Also, the scheduler may control the first task set including the tasks 504, 506, and 507 to be processed in the first core 501, and also control the second task set including the tasks 505 and 508 to be processed in the second core 502. Consequently, the victim task, not being sensitive to the cache miss from among the assigned tasks may be divided into a plurality of parts and processed in other cores.

Thus, each of the task sets may have a sum of weights that is less than a number of cores, and may be processed as a largest number of tasks.

Figure 6:
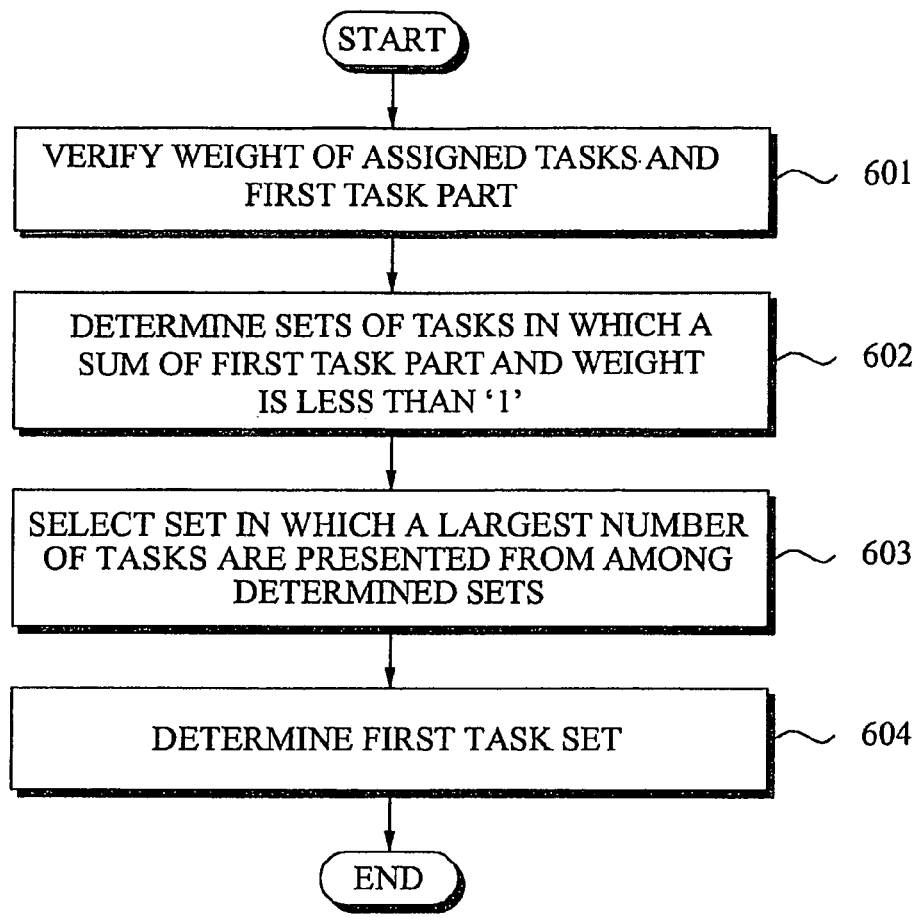
FIG. 6 is a flowchart illustrating that a first task set is determined by a CPU in which a real-time scheduling method according to an example embodiment is applicable.

FIG. 6 is a flowchart illustrating that a first task set is determined by a CPU in which a real-time scheduling method according to an example embodiment is applicable.

In operation 601, the real-time scheduling method according to the present example embodiment may verify a weight of the assigned tasks and the first task part to determine a first task set.

In operation 602, the real-time scheduling method may determine sets of tasks in which a sum of the first task part and weight is less than '1' from among the assigned tasks.

Specifically, the real-time scheduling method may verify the first task part and combinations of the tasks, and determine, as the sets of the tasks, a combination in which a sum of weights is less than a number of cores from among the combinations.

Next, the real-time scheduling method may select a set in which a largest number of tasks are presented from among the determined tasks in operation 603, and supplement the first task part in the selected set to determine the first task set in operation 604.

Specifically, to increase efficiency of processing, the real-time scheduling method may select a set in which a largest number of tasks are presented from among the determined sets, and supplement a divided part of the victim task in the selected set to generate the first task set.

In this instance, a weight of the first task set is required to be determined within a number of cores processing the first task set.

A method of determining the first task set as described in FIG. 6 will be applicable in a method of determining the second task set.

Specifically, the real-time scheduling method may verify a sum of weights of the assigned tasks and the first task part to determine the second task set.

Next, the real-time scheduling method may determine sets of tasks in which a sum of the second task part and weight is less than the number of cores from among the assigned tasks.

Also, the CPU may select a set in which a largest number of tasks are presented from among the determined sets, and supplement the second task part in the selected set to determine the second task set.

The real-time scheduling method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. A real-time scheduling method, comprising:
   verifying a weight of each of a plurality of tasks;
   determining a first task set and a second task set from the plurality of tasks using the verified weights;
   scheduling the first task set to be processed in a first core of a central processing unit comprising a plurality of cores;
   scheduling the second task set to be processed in at least one of a second core and a third core of the central processing unit; and
   processing at least one of the first scheduled task set and the second scheduled task set,
   wherein the weight of each of the plurality of tasks is a number greater than or equal to 0 and less than or equal to 1, and related to the execution time duration of the task, and
   wherein the determining the first task set includes:
   determining tasks in which a pre-calculated cache hit ratio is higher than a predetermined ratio from among the plurality of tasks;
   determining sets of tasks in which a sum of weights is less than a number of cores from among the determined tasks; and
   determining the first task set in which a largest number of tasks are presented from among the determined sets.

2. The real-time scheduling method of claim 1, further comprising determining the second task set including remaining tasks other than the first task set.

3. A real-time scheduling method, comprising:
   verifying a weight with respect to each of a plurality of tasks;
   determining a victim task not sensitive to cache miss from among the plurality of tasks;
   dividing the determined victim task into a first task part and a second task part;
   determining a first task set including the first task part, using the verified weights;
   determining a second task set including the second task part; and
   processing the determined first task set in a first core of a central processing unit and processing the determined second task set in a second core of the central processing unit,
   wherein the weight is a number greater than or equal to 0 and less than or equal to 1, and related to the execution time duration of the task, and
   wherein the determining the first task set further includes:
   determining sets of tasks in which a sum of the weights of the tasks is less than a number of cores from the plurality of tasks, based on the verified weight; and
   selecting a set of tasks in which a largest number of tasks are presented from among the determined sets and supplementing the first task part in the selected set to determine the first task set.

4. The real-time scheduling method of claim 3, wherein the determining the second task set further includes using the verified weights.

5. The real-time scheduling method of claim 4, wherein the determining the second task set further includes:
   determining sets of tasks in which a sum of the weights of the tasks is less than a number of cores, based on the verified weight; and
   selecting a set in which a largest number of tasks are presented from among the determined sets and supplementing the second task part in the selected set to determine the second task set.

6. A non-transitory computer-readable medium storing a program to implement a method, comprising:
   verifying a weight of each of a plurality of tasks;
   determining a first task set and a second task set using the verified weights;
   scheduling the first task set to be processed in a first core of a central processing unit comprising a plurality of cores;
   scheduling the second task set to be processed in at least one of a second core and a third core of the central processing unit; and
   processing at least one of the first scheduled task set and the second scheduled task set,
   wherein the weight of each of the plurality of tasks is a number greater than or equal to 0 and less than or equal to 1, and related to the execution time duration of the task, and wherein the determining the first task set includes:

determining tasks in which a pre-calculated cache hit ratio is higher than a predetermined ratio from among the plurality of tasks;

determining sets of tasks in which a sum of weights is less than a number of cores from among the determined tasks; and determining the first task set in which a largest number of tasks are presented from among the determined sets.

7. A central processing unit (CPU), comprising:

a plurality of tasks, each task having a weight;

a plurality of cores processing the plurality of tasks; and a scheduler scheduling the plurality of tasks in the plurality of cores, wherein the scheduler verifies the weight with respect to each of the plurality of tasks, and determines sets of tasks in which a sum of weights is less than a number of cores from among the plurality of tasks, based on the verified weight;

wherein the weight is a number greater than or equal to 0 and less than or equal to 1, and related to the execution time duration of the task, and wherein the plurality of cores includes a first core and a second core, and the scheduler determines a victim task not sensitive to cache miss from among the plurality of tasks and divides the determined victim task into a first task part and a second task part.

8. The CPU of claim 7, wherein the plurality of cores further includes a third core, and the scheduler determines a first task set from among the plurality of tasks to schedule the determined first task set in the first core, and determines a second task set from among the plurality of tasks to schedule the determined second task set in at least one core of the second core and the third core.

9. The CPU of claim 7, wherein the scheduler further determines a set in which a largest number of tasks is presented from among the determined sets of tasks as the first task set.

10. The CPU of claim 9, wherein the scheduler further determines remaining tasks other than the first task set from among the plurality of tasks as a second task set.

11. The CPU of claim 7, wherein the scheduler further determines a first task set including the first task part of the plurality of tasks, and determines a second task set including the second task part of the plurality of tasks.

12. The CPU of claim 11, wherein the scheduler further processes the determined first task set in the first core, and processes the determined second task set in the second core.

* * * * *

UNITED STATES PATENT AND TRADEMARK OFFICE
CERTIFICATE OF CORRECTION

Page 1 of 1

PATENT NO. : 8,782,649 B2
APPLICATION NO. : 12/453171
DATED : July 15, 2014
INVENTOR(S) : Min Kyu Jeong It is certified that error appears in the above-identified patent and that said Letters Patent is hereby corrected as shown below:

On the Title Page, Item [54] and in the Specification, Column 1, Line 4, (Title), Delete "RADIO" and insert -- RATIO --, therefor.

Column 2, Item [56] (Other Publications), Line 11, Delete "ral-Time" and insert -- real-Time --, therefor.

Signed and Sealed this
Thirteenth Day of January, 2015

Michelle K. Lee
*Deputy Director of the United States Patent and Trademark Office*